United States Patent [19]

Morioka et al.

[11] Patent Number: 5,465,158

[45] Date of Patent: Nov. 7, 1995

[54] VIDEO TAPE RECORDER CAPABLE OF RECORDING AND REPRODUCING WIDE-BAND CHROMINANCE SIGNAL

[75] Inventors: Yoshihiro Morioka, Neyagawa; Masaaki Kobayashi, Kawanishi; Mutsuyuki Okayama, Kobe; Etsuto Nakatsu, Hirakata; Kohei Suzuki, Takatsuki, all of Japan

[73] Assignee: Matsushita Electric Industrial Co., Ltd., Osaka, Japan

[21] Appl. No.: 409,964

[22] Filed: Mar. 24, 1995

Related U.S. Application Data

[63] Continuation of Ser. No. 28,170, Mar. 9, 1993, abandoned.

[30] Foreign Application Priority Data

Mar. 17, 1992 [JP] Japan .................... 4-060228

[51] Int. Cl.⁶ .................... H04N 9/79; H04N 9/80
[52] U.S. Cl. .................... 358/310; 358/330; 358/334; 348/489
[58] Field of Search .................... 358/310, 330, 358/334; 348/488, 489; H04N 9/79, 9/80, 9/815, 9/825

[56] References Cited

U.S. PATENT DOCUMENTS 4,862,292  8/1989  Enari et al. .................... 358/335
5,027,229  6/1991  Suwa et al. .................... 358/341
5,223,944  6/1993  Shimada et al. .................... 358/310

FOREIGN PATENT DOCUMENTS

0143654A2  6/1985  European Pat. Off. .
62-249594  10/1987  Japan .
3052115  3/1991  Japan .
WO91/16790  10/1991  WIPO .
WO91/16792  10/1991  WIPO .
WO92/04802  3/1992  WIPO .

OTHER PUBLICATIONS

"The Videotape Recorder: Its Evolution and the Present State of the Art of VTR Technology", Sugaya, SMPTE Journal, Mar. 1986, pp. 301–309.

*Primary Examiner*—Tommy P. Chin
*Assistant Examiner*—Khoi Truong
*Attorney, Agent, or Firm*—Wenderoth, Lind & Ponack

[57] ABSTRACT

In a video tape recorder of the color under recording type, in which a low frequency band converted carrier chrominance signal is recorded together with an FM luminance signal, another FM modulator is provided for modulating a wide band chrominance signal. An additional head records the FM chrominance signal on at least a part of a track on which video signal has been recorded in the color under recording. In reproduction, it is checked whether the FM chrominance signal is reproduced or not for selecting the FM chrominance signal or the color under recorded carrier chrominance signal as a reproduced chrominance signal output.

5 Claims, 6 Drawing Sheets

VIDEO TAPE RECORDER CAPABLE OF RECORDING AND REPRODUCING WIDE-BAND CHROMINANCE SIGNAL

This application is a Continuation of now abandoned application, Ser. No. 08/028,170, filed Mar. 9, 1993.

BACKGROUND OF THE INVENTION

1. Field of the Invention

The present invention relates to a video tape recorder (hereinafter abbreviated as VCR) for recording and reproducing color video signals of an NTSC system, an EDTV (Extended Definition Television) system, and an HDTV (High Definition Television) system such as, for example, Ill-Vision system, a or the like, on a magnetic tape or the like.

2. Description of the Prior Art

As home-use video tape recorders (VCRs) for recording color video signals, VCRs of the VHS type and the 8 mm type are widely used. In particular, the number of VCRs of the VHS type used around the world is more than 250 million sets. The VCR is one of the indispensable items in the general household. In these VCRs, for example, an input NTSC color video signal is separated into a luminance signal and a carrier chrominance signal; the luminance signal is frequency modulated by a low frequency carrier, and the carrier chrominance signal is converted to a low frequency band, before being recorded on a magnetic tape. This color recording and reproducing method is explained, for example, by H. Sugaya in "The Videotape Recorder: Its Evolution and the Present State of the Art of VCR Technology," SMPTE Journal, March 1986, Volume 95, Number 3, pp. 301–309.

On the other hand, a method for recording and reproducing a video signal by overlaying an audio signal of high quality in the upper layer of a video signal recording layer is disclosed in Japanese Laid-open Patent Application No. 62-249594. In the conventional VCRs, in particular, since the chrominance signal is recorded after being converted to a low frequency bandwidth, the band and S/N ratio of the chrominance signal during reproducing are extremely inferior to those of the luminance signal, so that the reproduction image quality is limited due to the poor quality of the chrominance signal. Especially in a VCR of the S-VHS type in which the luminance signal has a wider frequency band so as to be higher in quality, the quality difference between the chrominance signal and luminance signal is increased.

SUMMARY OF THE INVENTION

It is hence a primary object of the present invention to enhance the reproducing picture quality notably by presenting a VCR capable of recording and reproducing chrominance signals with a wider band width and at a higher S/N ratio than in the prior art, in a home-use VCR of the color recording type in which the chrominance signal is converted to a low frequency bandwidth. For example, by widening the band of the chrominance signal in the home-use VCR of the S-VHS type from about 350 kHz in the prior art to about 1 MHz or more, and improving the S/N ratio from about 45 dB in the prior art to about 48 dB or more for the S/N ratio of the AM component in chrominance signal (the ratio of signal to noise of amplitude modulation component) and the S/N ratio of the PM component in the chrominance signal (the ratio of signal to noise of the phase modulation component), a higher image quality is obtained.

It is another object of the invention to maintain compatibility of reproduction with the conventional VCRs so that a color video signal recorded by a VCR of this invention can be reproduced by a conventional VCR and vice versa.

To achieve the above objects, according to the invention, first in the same manner as in the prior art, a frequency modulated luminance signal and a low frequency band converted chrominance signal are mixed and recorded by a first head. Then, a chrominance signal of wider bandwidth than in the prior art is frequency modulated, and is overlay-recorded by a second head on a part or whole of the recording track of the color video signal recorded by the first head as above.

According to the VCR of the present invention, in the case of reproduction, if the frequency modulated wind wide band chrominance signal is reproduced, a reproduced luminance signal and this wide band chrominance signal are produced as a reproduced color video signal. If the frequency modulated chrominance signal is not reproduced, the luminance signal and the low band converted chrominance signal of the conventional type are produced as a reproduced color video signal.

Thus, according to the present invention, while keeping compatibility of reproduction of color video signals with the conventional VCR of color under system, a high quality chrominance signal of high S/N ratio and wide bandwidth can be newly recorded and reproduced.

DESCRIPTION OF THE PREFERRED EMBODIMENTS

Figure 1A:
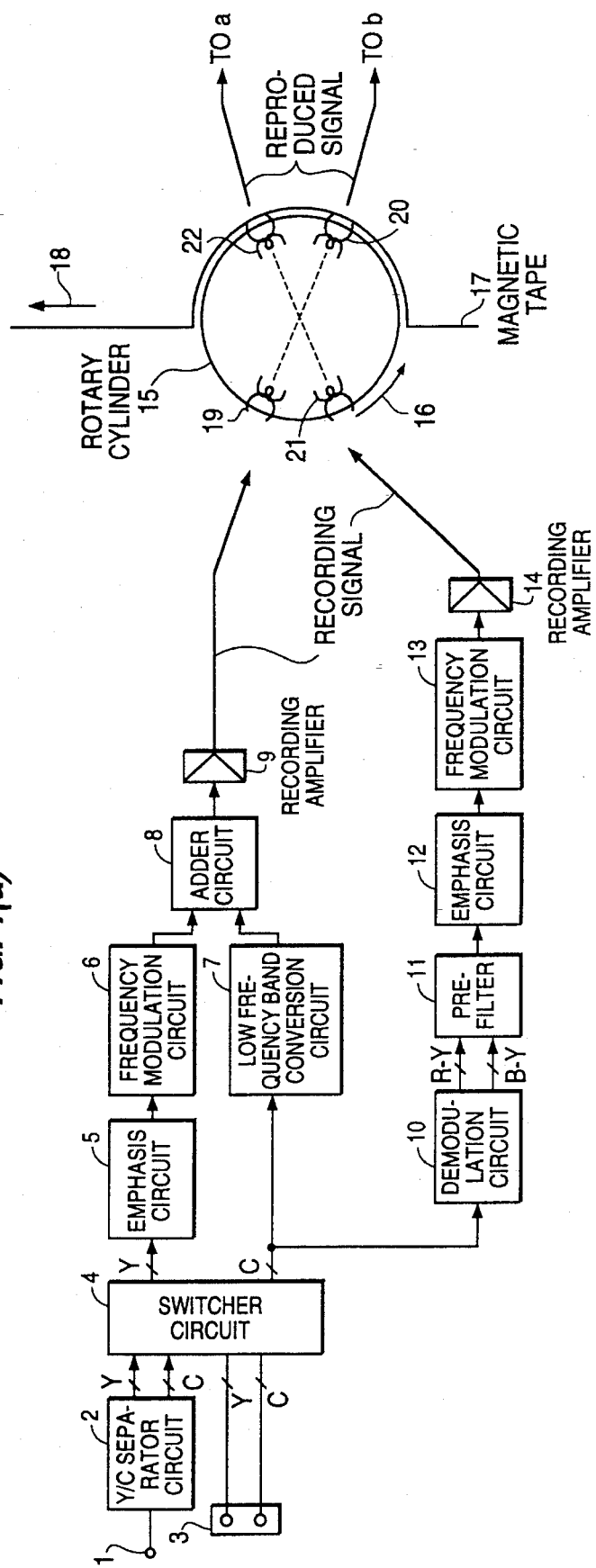
FIGS. 1(a) and 1(b) together are a schematic block diagram of a VCR accordance in an embodiment of the present invention.

Referring now to the drawings, a first embodiment of the invention is described in detail below.

Figure 1B:
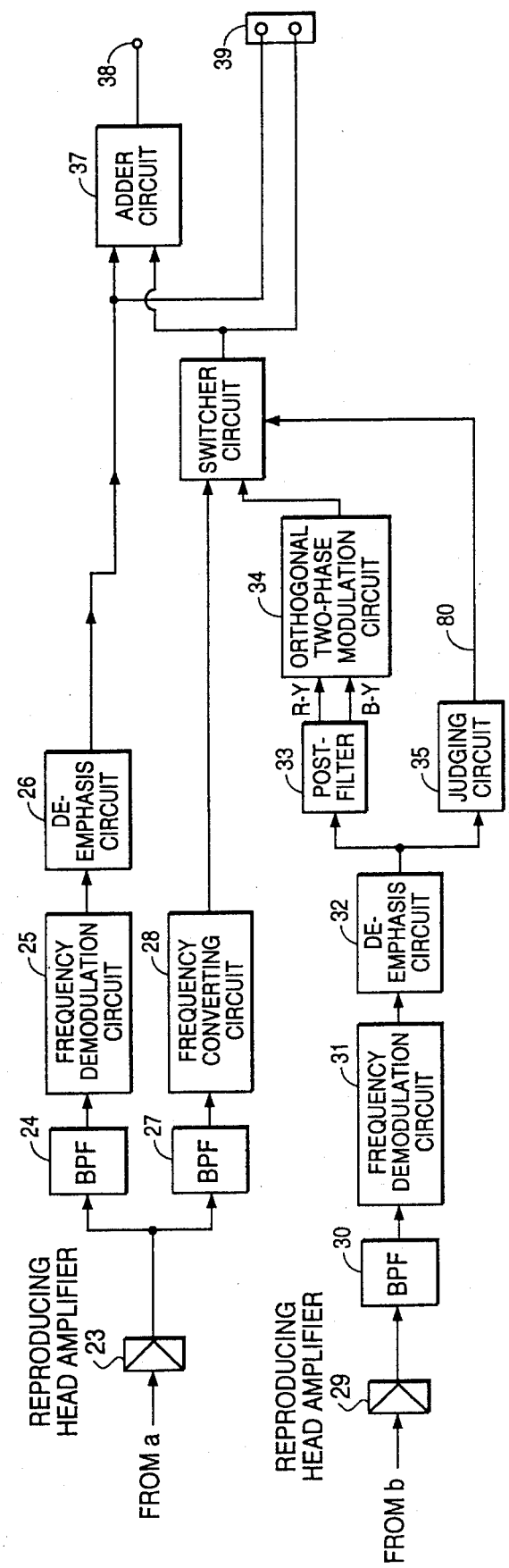

FIGS. 1(a) and 1(b) together are a schematic block diagram of a VCR in accordance with the first embodiment of the present invention. In FIG. 1(a), an NTSC composite video signal is inputted from a first input terminal 1, and is separated into a luminance signal Y and a carrier chrominance signal C in a Y/C separator circuit 2. Moreover, from a second input terminal pair 3, a luminance signal Y and a carrier chrominance signal C of components for composing an NTSC video signal are inputted. A switcher circuit 4 selects either pair of Y and C signals produced from the Y/C separator circuit 2 or inputted from the input terminal pair 3, and outputs a selected pair of Y and C signals.

The output Y of the switcher circuit 4 is subjected to linear or nonlinear emphasis in an emphasis circuit 5, and then frequency modulated in an FM circuit 6. The output C of the switcher circuit 4 is fed into a low band converter circuit 7, and converted in frequency to a lower frequency band than the frequency modulated Y signal. The frequency modulated Y signal and low band converted C signal are added together in an adder circuit 8 and amplified by a recording amplifier 9. The output C of the switcher circuit 4 is, on the other hand, demodulated into two base band color difference signals (R-Y) and (B-Y) in a demodulation circuit 10, and aliasing signals in the vertical direction of the screen are removed by a pre-filter 11. The output of the pre-filter 11 is such that the (R-Y) color difference signal and (B-Y) color difference signal occur alternately at intervals of one horizontal sync period (1H), which is the so-called line sequential color difference signal.

Figure 2A:
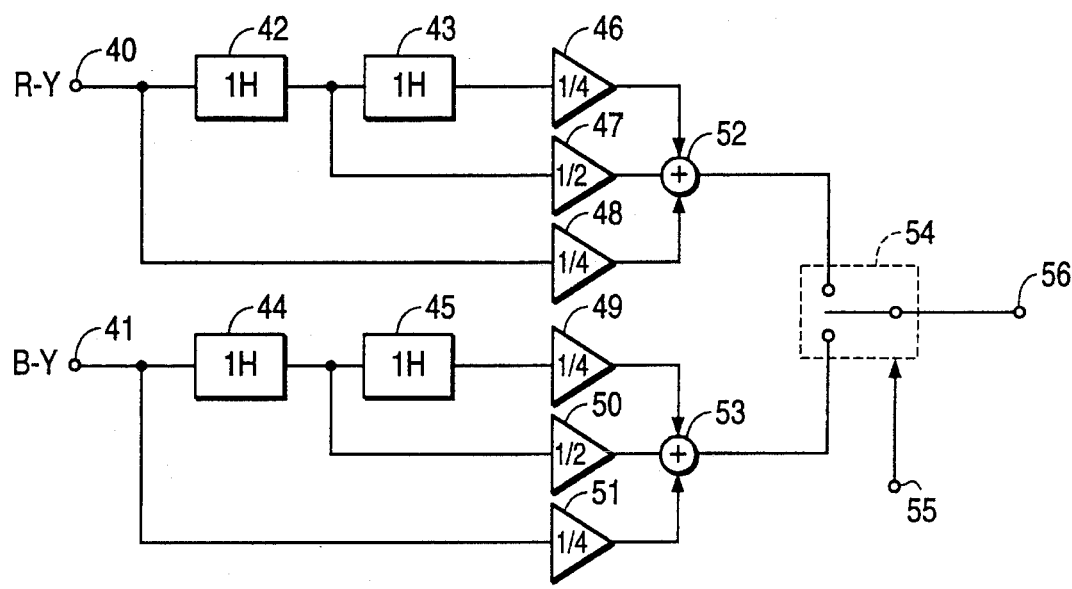
FIGS. 2(A) and 2(B) are structural example of a pre-filter and a post-filter in accordance with an embodiment of the present invention.

An example of the pre-filter circuit 11 of line sequential system is shown in FIG. 2(A). In FIG. 2(A), the (R-Y) color difference signal and (B-Y) color difference signal are respectively inputted through input terminals 40 and 41. The input (R-Y) color difference signal passes through 1H delay circuits 42 and 48, and multiplied in a multiplier circuit 46 by a coefficient of multiplication of 0.25. The output of the multiplier circuit 46 is fed to an adder circuit 52. The (R-Y) color difference signal passed through the 1H delay circuit 42 is multiplied in a multiplier circuit 47 by a coefficient of multiplication of 0.5, and the output of the multiplier circuit 47 is fed to the adder circuit 52. The input (R-Y) color difference signal itself multiplied in a multiplier circuit 48 by a coefficient of multiplication of 0.25, and the output of the multiplier circuit 48 is fed to the adder circuit 52. The output of the adder circuit 52, which is a sum of the outputs of the multiplier circuits 46–48, is fed to one of the two input terminals of a switcher circuit 54. On the other hand, the input (B-Y) color difference signal passes through 1H delay circuits 44 and 45, and multiplied in a multiplier circuit 49 by a coefficient of multiplication of 0.25. The output of the multiplier circuit 49 is fed to an adder circuit 53. The (R-Y) color difference signal passed through the 1H delay circuit 44 is multiplied in a multiplier circuit 50 by a coefficient of multiplication of 0.5, and the output of the multiplier circuit 50 is fed to the adder circuit 53. The input (R-Y) color difference signal itself is multiplied in a multiplier circuit 51 by a coefficient of multiplication of 0.25, and the output of the multiplier circuit 51 is fed to the adder circuit 53. The output of the adder circuit 53, which is a sum of the outputs of the multiplier circuits 49–51, is fed to the other one of the two input terminals of the switcher circuit 54. In response to a changeover signal which inverts its state between low and high levels at intervals of 1H and is fed from an input terminal 55, the switcher circuit 54 changes over the (R-Y) color difference signal and (B-Y) color difference signal at intervals of 1H to obtain the line sequential signal at an output terminal 56. This changeover signal may be easily obtained, for example, by feeding a horizontal sync signal into a flip-flop circuit. In this constitution, a line sequential color difference signal eliminating the aliasing distortion in the vertical direction of the screen is obtained at the output terminal 54 of the switcher circuit.

Moreover, by composing a pre-filter of higher degree by increasing the number of stages of the line memories (1H delay circuits) in the pre-filter, the cut-off characteristic in the vertical direction of the screen can be enhanced. As an example of pre-filter construction in this case, a six-line, seven-tap filter using seven 1H line memories is well known, and it is applied in a partial reference specification of the so-called Uni-Hi VCR which is a professional HD-VCR. Moreover, it is of the same concept as in the method recently applied in the three-dimensional Y/C separator circuit or the like, and it is effective to compose a logical pre-filter for adaptively removing color blurring.

Referring back to FIGS. 1(*a*) and 1(*b*), the line sequential color difference signal which is the output of the pre-filter circuit 11 is subjected to linear or nonlinear emphasis in an emphasis circuit 12, and then frequency-modulated in a frequency modulation circuit 13. The frequency modulated chrominance signal from the frequency modulation circuit 13 is amplified in a recording amplifier 14. A rotary cylinder 15 rotates in a rotating direction 16. A magnetic tape 17 runs in a running direction 18. Four magnetic heads 19, 20, 21, and 22 are mounted on the rotary cylinder 15, and the azimuth angles of the gaps of these four magnetic heads are individually different. The magnetic tape 17 is wound on the circumference of the rotary cylinder 15 over about 180 degrees so that each of the four magnetic heads scans obliquely on the magnetic tape 17. In short, this constitution is a so-called helical scan video tape recorder.

The output of the recording amplifier 9 is fed to two magnetic heads 19 and 20 disposed to be apart by about 180 degrees from each other on the circumference of the rotary cylinder 15 through a conventional rotary transformer, and forms a first signal recording track on the magnetic tape 17. The output of the recording amplifier 14 is, on the other hand, fed to two magnetic heads 21 and 22 disposed to be apart by about 180 degrees from each other on the circumference of the rotary cylinder 15, and forms a second signal recording track on the magnetic tape 17.

Herein, the output of the recording amplifier 9 is set at the so-called saturated recording level so that the recording current of the heads 19 and 20 may be at the recording level at which the reproduction output from the magnetic tape is nearly at the maximum. The output of the recording amplifier 14 is set at a recording level so that the recording current of the heads 21 and 22 may be slightly lower than the recording level at which the reproduction output from the magnetic tape is at the maximum. Since the recording level of the heads 21 and 22 is smaller than that of the heads 19 and 20, the second signal recording track recorded in the two heads 21 and 22 may be overlaid on the first signal recording track recorded by the two heads 19 and 20 without causing the signal recorded in the first signal recording track to be erased completely.

That is, in this embodiment, for example, while reproducing the FM luminance signal and low frequency band chrominance signal used in the conventional VHS type or S-VHS type from the signal recording track, it is possible, at the same time, to record and reproduce a chrominance signal of higher quality than the low frequency band chrominance signal recorded in the conventional VHS type or S-VHS type in a new signal recording track.

Figure 3:
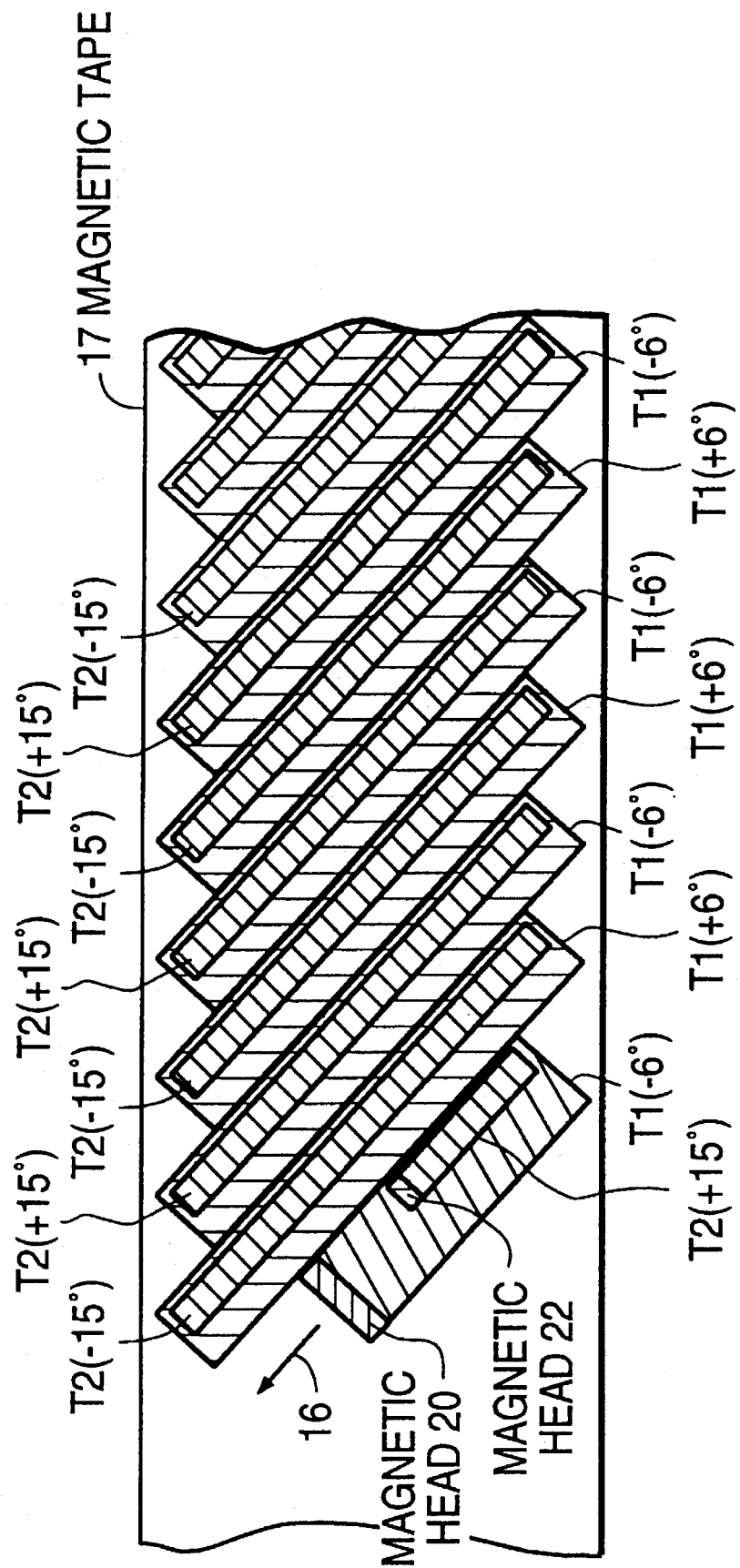
FIG. 3 is a recording track pattern diagram in accordance with an embodiment of the present invention.

FIG. 3 shows an example of recording track pattern. In FIG. 3, the azimuth angles of the magnetic heads 19 and 21 are respectively +6 and –15 degrees. The azimuth angles of the magnetic heads 20 and 22 are respectively –6 and +15 degrees, so that the azimuths of the heads apart by 180 degrees from each other on the cylinder are opposite to each other. In FIG. 3, T1(+6) and T1(–6) are tracks recorded by the magnetic heads 19 and 20, respectively, and T2(+15) and T2(–15) are tracks recorded by the magnetic heads 22 and 21, respectively. The recording track width of T1(+6), T1(–6) is 19.3 microns, and the recording track width of T2(+15), T2(–15) is 10 microns.

Figure 4:
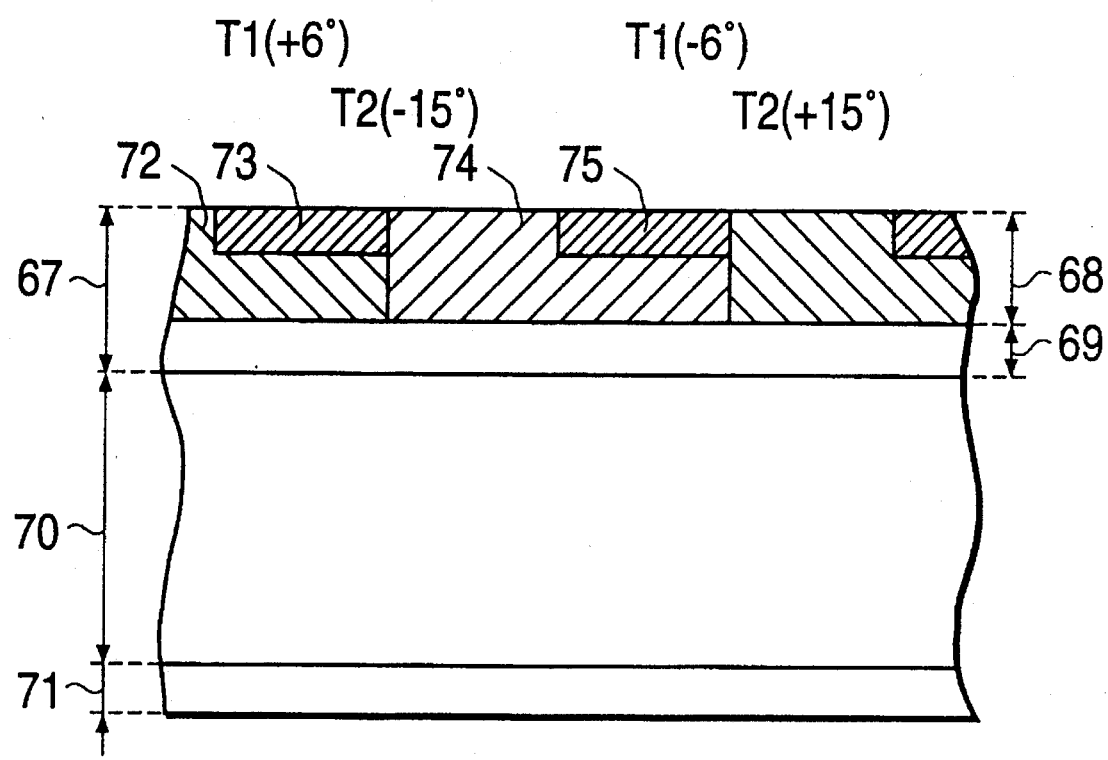
FIG. 4 is a cross-sectional view of a magnetic tape for showing a signal recorded state in an embodiment of the present invention.

FIG. 4 is a sectional view of the magnetic tape. In FIG. 4, the magnetic tape is composed of a magnetic layer 67, a signal recording layer 68, a no-signal recording layer 69, a base film 70, and a back coat 71. The recording tracks comprise T1(+6) track 72, T2(−15) track 73, T1(−6) track 74, and T2(+15) track 75. The T2(+15) track 73 and T2(−15) track 74 are small in the signal recording level, and the depth of signal recording is relatively shallow as compared with the prior art, so that the signals are recorded mainly in the superficial layer of the magnetic tape. As the magnetic tape medium, for example, a magnetic material with a large coercive force (He) is used in the superficial layer, and a magnetic material with a small coercive force (Hc) is laminated in the deeper layer. In this case, when a ring type head is used for recording and reproducing, two signals can be effectively recorded separately in the upper layer and lower layer of the magnetic tape according to the spatial distribution of intensity of magnetic field during recording and reproducing, or the magnetic recording and reproducing principle of space loss or the like at during the time of reproducing.

Figure 5A:
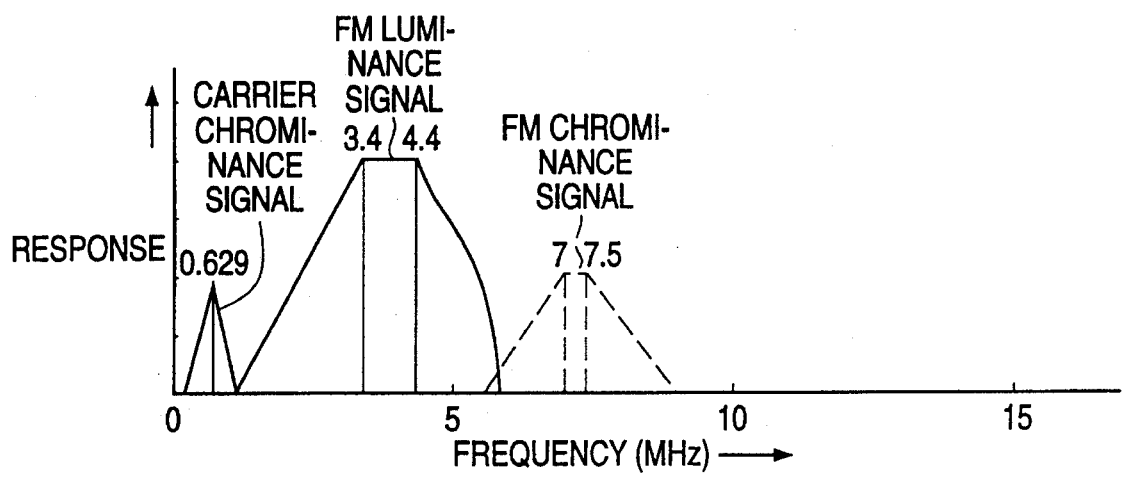
FIGS. 5(A) and 5(B) are frequency response diagram for explaining the frequency configuration of recorded signals in an embodiment of the present invention.
Figure 5B:
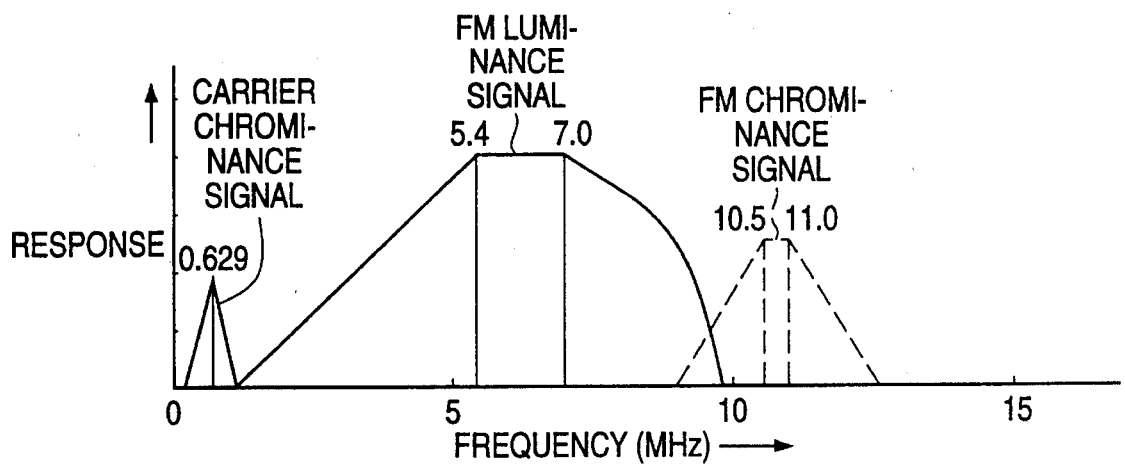

Examples of the frequency configuration of this recording system are shown in FIG. 5(A) and FIG. 5(B). FIG. 5(A) shows a case of applying the invention in the conventional VHS type VCR. The FM luminance signal is in a band from about 1 MHz to about 6 MHz, and no signal is recorded in the band above 6 MHz. Herein, the FM chrominance signal is recorded and reproduced in a band from 5 MHz to 8 MHz. To record and reproduce the FM chrominance signal favorably, it is enough when the CN ratio of the reproduction carrier is about 35 dB (noise bandwidth 30 kHz). According to the result of verification experiments of the recording and reproducing principle, it was confirmed, by using a magnetic tape for S-VHS, that the CN ratio of the FM chrominance signal can be maintained at 35 dB or higher within about 1 dB of deterioration the CN ratio the conventional VHS recording signal. If lowering of reproduction output is 2 dB, the noise level is also lowered, and hence the lowering of the CN ratio is one half, or 1 dB. If the band of the FM luminance signal and that of FM chrominance signal are overlapped, it is possible to eliminate the crosstalk jamming by the azimuth loss between recording tracks. In this example, the recording band of the FM chrominance signal ranges from 5 MHz to 8 MHz, but even in the band from 2 MHz to 4 MHz, the FM luminance signal and FM chrominance signal can share the same band by making use of the azimuth loss effect.

FIG. 5(B) shows a case of application of the invention in a conventional S-VHS type VCR. The FM luminance signal is in a band from about 1 MHz to about 10 MHz, and no signal is recorded in the band above 10 MHz. Herein, the FM chrominance signal is recorded and reproduced in a band from 9 MHz to 14 MHz, but even in the band from 2 MHz to 5 MHz, or from 5 MHz to 8 MHz, as in the case of VHS, the FM luminance signal and FM chrominance signal can share the same band by making use of the azimuth loss effect.

In FIGS. 1(a) and 1(b) incidentally, when reproducing, the outputs of the two magnetic heads 19 and 20 obtained via the rotary transformer are amplified in a reproducing head amplifier 23. The outputs of the two magnetic heads 21 and 22 are amplified in a reproducing head amplifier 29.

The output of the head amplifier 23 is fed to a band pass filter (BPF) 24, in which only the FM luminance signal is extracted. The FM luminance signal is demodulated into a base band luminance signal in an FM demodulation circuit 25, and is de-emphasized in a de-emphasis circuit 26. The output of the reproducing head amplifier 23 also reaches a BPF 27, in which the carrier chrominance signal converted in low frequency band is extracted. The extracted carrier chrominance signal is converted into a frequency of an NTSC signal in a frequency converter circuit 28, and is fed into a switcher circuit 36.

The output of the head amplifier 29 is sent to a BPF 30, in which the FM chrominance signal is extracted. The FM chrominance signal is demodulated into a base band signal in an FM demodulation circuit 31, and is de-emphasized in a de-emphasis circuit 32. The output of the de-emphasis circuit 32 is decoded into a set consisting of an (R-Y) signal and a (B-Y) signal in a post-filter 33. The (R-Y) and (B-Y) signals are subjected to quadrature bi-phase modulation in a quadrature bi-phase modulation circuit 34 to become a carrier chrominance signal. This carrier chrominance signal is fed into the switcher circuit 36. The post-filter 33 may be composed similarly to the pre-filter.

Figure 2B:
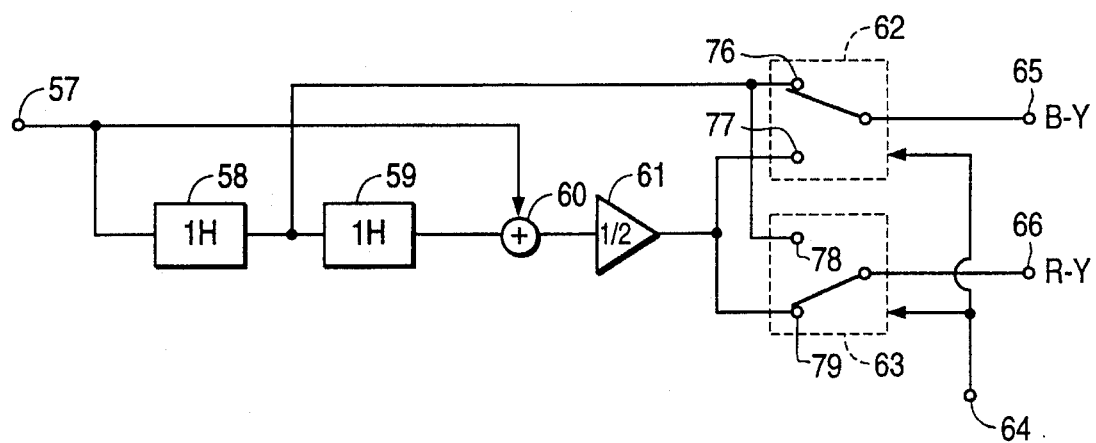

An example of the post-filter 33 of the color difference signal line sequential system is shown in FIG. 2(B). In FIG. 2(B), the line sequential color difference signal containing the alternately occurring (R-Y) color difference signal and (B-Y) color difference signal is fed through an input terminal 57. The input line sequential color difference signal is directly fed into an adder circuit 60, and is also fed to the adder circuit 60 in the route of passing through 1H delay circuits 58 and 59. The output of the adder circuit 60, which is a sum of the input signal and the output signal of the 1H delay circuit 59, is multiplied in a multiplier circuit 61 by a coefficient of multiplication of 0.5. The output of the multiplier circuit 61 is fed into input terminals 77 and 79 of two switcher circuits 62 and 63. The output of the 1H delay circuit 58 is fed into input terminals 76 and 78 of the two switcher circuits 62 and 63. The outputs of the two switcher circuits 62 and 63 are changed over between the (R-Y) color difference signal and the (B-Y) color difference signal at intervals of 1H in response to a changeover which is supplied through an external input terminal 64 so that the (B-Y) signal is sent out from an output terminal 65 and (R-Y) signal is sent out from an output terminal 66. This changeover signal may be similar to the changeover signal for controlling the switcher circuit 54 and obtained easily by feeding, for example, a horizontal sync signal to a flip-flop circuit. In this constitution, from the output terminals 65 and 66 of the two switcher circuits 62 and 63, the two color difference signals (B-Y) and (R-Y) free from the aliasing distortion in the vertical direction of the screen can be obtained.

Moreover by composing a post-filter of a higher degree by increasing the number of stages of the line memories in the post-filter, the cut-off characteristic in the vertical direction of the screen can be enhanced. As an example of post-filter construction in this case, a six-line, seven-tap filter using seven 1H line memories (1H delay circuits) is well known, and it is applied in a partial reference specification of the Uni-Hi VCR. Moreover, it is of the same concept as in the method recently applied in the three-dimensional Y/C separator circuit or the like, and it is effective to compose a logical post-filter for adaptively removing color blurring.

A part of the output of the de-emphasis circuit 32 reaches a judging circuit 35 to judge whether the frequency modulated line sequential color difference signal has been reproduced or not. In this Judging method, it is judged whether the horizontal sync signal of the frequency modulated line sequential color difference signal is reproduced and demodulated or not. The switcher circuit 36 is responsive to an output 80 of the judging circuit 35 indicating the judgement result. As a result of judgement, if the horizontal sync signal of the FM chrominance signal is not normally reproduced, the output of the frequency converter circuit 28 is selected as the output of the switcher circuit 36. As a result of judgement, if the horizontal sync signal of the FM chrominance signal has been normally reproduced, the output of the quadrature bi-phase modulation circuit 34 is selected as the output of the switcher circuit 35.

Consequently, the reproduced luminance signal Y which is an output from the de-emphasis circuit 24 and the reproduced carrier chrominance signal C which is an output from the switcher circuit 35 are added to each other in an adder circuit 37, and outputted from an output terminal 38. The reproduced luminance signal Y from the de-emphasis circuit 24 and the reproduced carrier chrominance signal C from the switcher circuit 35 are respectively outputted from an output terminal pair 39 as component signals.

The tape recorded in the VCR of this invention contains signals recorded in the same manner as in the conventional VHS type or S-VHS type VCRs; the tape can be reproduced in a conventional VHS or S-VHS type VCR to reproduce a color video signal.

In this embodiment, meanwhile, the case of using frequency modulated line sequential color difference signal is explained as an example of the signal to be overlaid and recorded in the color video signal track, but the same effect can be obtained by using the color difference signal that is expanded, compressed and multiplexed on the time axis. As an example of the chrominance signal converted in the time axis, for example, the CTCM signal (chroma time compressed multiplexing signal) practically used in the M-II type VCR which is a professional broadcasting VCR is known.

Thus, as the signal to be overlaid and recorded in the color video signal track, the same effect can be obtained with any analog signal or digital signal obtained by modulating the information of color signals.

What is claimed is:

1. A video signal recorder comprising:

a converter, said converter converting an input color video signal into a luminance signal, a carrier chrominance signal, and two color difference signals;

a first frequency modulator, said first frequency modulator frequency modulating the luminance signal;

a low frequency band converter, said low frequency band converter converting a frequency band of the carrier chrominance signal to a low frequency band to obtain a low frequency band converted carrier chrominance signal;

a second frequency modulator, said second frequency modulator frequency modulating the color difference signals to obtain a frequency modulated chrominance signal;

an adder, said adder adding the low frequency band converted carrier chrominance signal and the frequency modulating luminance signal to obtain a recording video signal;

a first head for recording the recording video signal on an recording medium to form a first recording track) and a second head for recording the frequency modulated chrominance signal on said recording medium so as to form a second recording track oversaid on at least a part of the first recording track such that a recording layer of the recording medium in which said at least a part of the first recording track is formed is divided in a thickness direction thereof into a lower layer in which the first recording track is formed and an upper layer in which the second recording track is formed.

2. A video signal recorder of claim 1, wherein the first and second heads are used for reproducing signals from the first and second recording tracks, respectively, and wherein said recorder further comprises:

a judging means for judging whether or not the frequency modulated chrominance signal is reproduced by the second head and producing a judging signal indicating a judging result;

a first reproducer, said first reproducer processing a signal reproduced by the first head to obtain a pair of a reproduced luminance signal which has been recorded in the form of the frequency modulated luminance signal and a first reproduced carrier chrominance signal which has been recorded in the form of the low frequency band converted carrier chrominance signal;

a second reproducer, said second reproducer processing a signal reproduced by the second head to obtain a second reproduced carrier chrominance signal which has been recorded in the form of the frequency modulated chrominance signal; and an outputter responsive to the judging signal for outputting the reproduced luminance signal and the first reproduced carrier chrominance signal if the frequency modulated chrominance signal is not reproduced by the second head, and for outputting the reproduced luminance signal and the second reproduced carrier chrominance signal if the frequency modulated chrominance signal is reproduced by the second head.

3. A video signal recorder of claim 2, wherein the first reproducer comprises:

a separator, said separator separating the signal reproduced by the first head into a reproduced frequency modulated luminance signal and a reproduced low frequency band converted carrier chrominance signal;

a first frequency demodulator, said first frequency demodulator demodulating the reproduced frequency modulated signal to obtain the reproduced luminance signal; and a frequency band up-converter, said up-converter converting a frequency band of the reproduced low frequency band converted carrier chrominance signal to a high frequency band to obtain the first reproduced carrier chrominance signal, and wherein the second reproducer comprises:

a second frequency demodulator, said second frequency demodulator demodulating the signal reproduced by the second head to obtain reproduced two color difference signals; and a quadrature bi-phase modulator, said bi-phase modulator subjecting the reproduced two color difference signals to a quadrature bi-phase modulation to obtain the second reproduced carrier chrominance signal.

4. A video tape recorder of claim 1, wherein the first head comprises a first pair of magnetic heads which are disposed on a rotary cylinder to be apart from each other by 180 degrees and have opposite azimuth angles to each other and the second head comprises a second pair of magnetic heads which are disposed on the rotary cylinder to be apart from each other by 180 degrees and have opposite azimuth angles to each other, the azimuth angle of each of the first pair of magnetic heads being different from that of each of the second pair of magnetic heads.

5. A video tape recorder of claim 1, wherein the recording medium is a magnetic tape having lower and upper magnetic recording layers which are laminated in a thickness direction of said tape and have different coercive forces, and wherein said first head records the recording video signal in said lower magnetic recording layer and said second head records the frequency modulated chrominance signal in said upper magnetic recording layer.

* * * * *